Dec. 28, 1948.                F. E. BEST                 2,457,199
                    PROXIMITY AND DIRECTION INDICATOR
                          Filed Jan. 9, 1942
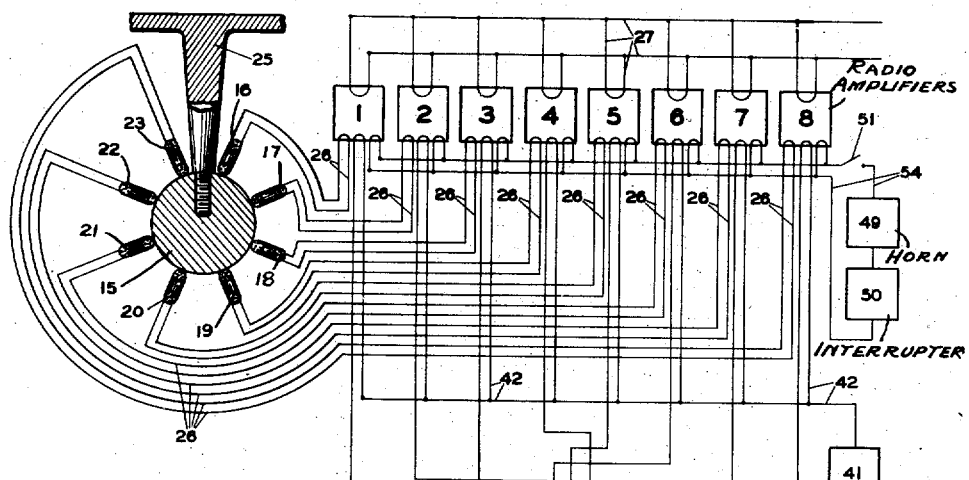
FIG. 1.
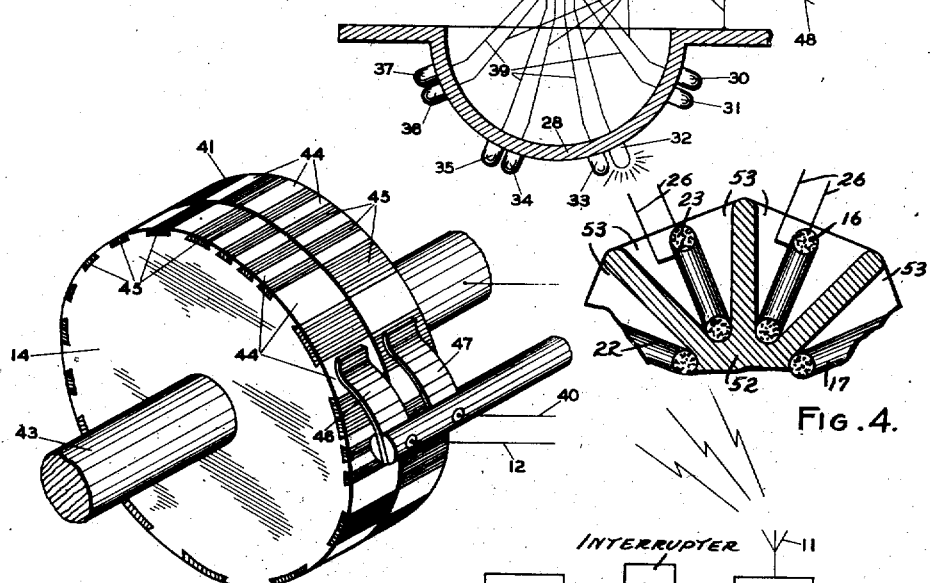
FIG. 2.
FIG. 4.
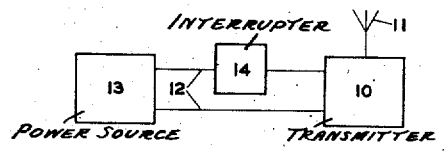
FIG. 3.
Frank Ellison Best.
INVENTOR.

Patented Dec. 28, 1948

2,457,199

UNITED STATES PATENT OFFICE 2,457,199

PROXIMITY AND DIRECTION INDICATOR

Frank Ellison Best, Indianapolis, Ind.

Application January 9, 1942, Serial No. 426,190

3 Claims. (Cl. 343—101)

This invention relates to a proximity and direction indicator for use on aircraft, watercraft or land vehicles to aid in the prevention of collisions, to aid in the carrying out of desired formations, and to aid in distinguishing between friend and foe in battle.

This proximity and direction indicator is especially well adapted for use in connection with the Ground follower map and navigation instrument disclosed in my co-pending patent application Serial No. 407,087, filed August 15, 1941, now abandoned.

It is an object of this invention to provide proximity and direction indicator means of simple and efficient construction adapted to be installed on a number of moving bodies such as a group of aircraft, watercraft, land vehicles, etc., and operable to broadcast from each moving body so equipped a radio signal for reception by all other nearby moving bodies similarly equipped to provide information on each moving body as to the proximity and direction of each other nearby moving body of the group.

It is another object of this invention to provide means for continuously transmitting from a station, such as from a moving body, a frequently interrupted radio signal of predetermined frequency, and means for receiving, at the same station, during time increments when the transmitting from that station is interrupted, signals of the same frequency that are broadcast from other nearby stations, thereby providing for both continuous intermittent transmission and continuous intermittent reception from the same station on the same frequency without interference between the said transmission and reception.

It sometimes happens that two aircraft will collide in flight, usually with fatal results to the pilots and passengers and complete destruction of both of the colliding craft. Such accidents may be due to carelessness but are more liable to be due to the fact that the pilot of neither craft could see the other craft until it was too late to prevent the collision. Poor visibility can occur in dense fog or clouds or at night or it can be due to blind spots inherent in the construction of the aircraft. Such accidents can also occur in blind flying, i. e., when the pilots are flying entirely by the use of instruments.

As applied to aircraft for the prevention of accidents it is desirable to require all aircraft to be equipped with this proximity and direction indicator and to require them to continuously broadcast a signal while in flight and to continuously maintain their receiving apparatus open for the reception of the signals from all other aircraft while in flight so that the pilot of each aircraft in flight would always receive a signal from every other nearby aircraft in flight indicating the proximity and direction of the other aircraft in ample time to enable the pilot to avoid a collision.

As applied to aircraft to aid in maintaining desired formations in flight and landing, each aircraft of the group or squadron is equipped with one of these devices and receives a signal from every other aircraft in the group showing each pilot the proximity and location of every other aircraft in the group. This makes it possible to maintain correct formations in flight and landing under all conditions of visibility such as when flying through clouds or fog or at night, or when flying blind, i. e., by the use of instruments only.

As applied to aircraft for military use for detecting whether another aircraft in the vicinity is a friend or foe, this device is installed on all of the aircraft used by one group in the conflict and the pilot of each craft so equipped would be able to identify and tell the location of a friendly craft by the signal received therefrom and to identify a hostile craft by the absence of any such signal therefrom.

The application of this invention to marine and/or land usage or to any combination of air, land and marine usage is similar to its application to aircraft usage as respects the prevention of accidents, the identification of friend and foe in battle, and the maintenance of desired formations under all conditions of visibility.

Other objects of the invention will be apparent from the following description taken in connection with the accompanying drawings.

In the drawings

Figure 1 is a diagrammatic view of the radio receiving and amplifying means and the signal means of a proximity and direction indicator constructed in accordance with my invention showing parts of the same in cross section.

Fig. 2 is a detached isometric view of an interrupter adapted to be used in the transmitting and receiving circuits of my device.

Fig. 3 is a diagrammatic view of a transmitter embodied in this device.

Fig. 4 is a fragmentary sectional view showing directional receiving means of modified form.

Like reference numerals designate like parts throughout the several views.

The radio transmitting devices, shown diagrammatically in Fig. 3, comprise a conventional radio transmitter 10, capable of producing and transmitting, through an antenna 11, a radio or electromagnetic wave, suitable for signaling purposes and preferably on a frequency that is not ordinarily used in long and short wave broadcasting and radio beams to thereby avoid confusion with ordinary broadcasts. The transmitter 10 is connected by conductors 12 with a source of power 13. An interrupter 14, shown diagrammatically in Fig. 3, and more in detail in Fig. 2, is connected in series with the transmitter 10.

The radio-receiving and signal devices are shown diagrammatically in Fig. 1. The directional radio-receiving antenna means includes a body such as a sphere 15 formed of material, such as lead, which will shield or deflect radio waves. Obviously this body 15 could be a figure or frame or body of different shape.

A plurality of radio receiving antenna loops, such as 16 to 23 inclusive, are secured to the body 15 and preferably are evenly distributed over the peripheryward portion thereof.

Any desired number of loops may be provided on the body 15. Eight loops are shown in Fig. 1 in the plane on which the cross section is taken and other loops are preferably provided on portions of the body 15 removed from the plane of cross section.

The body 15 is mounted in the aircraft or other moving body in a fixed position by a bracket 25.

Each directional radio receiving loop on the body 15 is connected with a radio amplifying device. For instance, the eight directional radio receiving loops 16 to 23 inclusive, shown in Fig. 1, are respectively connected by conductors 26 with radio amplifiers 1 to 8 inclusive. Electrical energy from an outside source is supplied to the radio amplifiers 1 to 8 through conductors 27 connected therewith. Obviously the conductors 27 may be connected with the power source 13.

The visual signal device shown herein comprises a semi-spherical body member 28 carrying signal lights arranged in pairs and disposed so that the position of each pair of signal lights corresponds to the position of two diametrically opposite radio receiving loops on the body 15. Eight signal lamps are shown in Fig. 1 and are numbered 30 to 37 inclusive. Preferably the two lamps of each pair are of different colors, such, for instance, as red and green. In Fig. 1 it is assumed that the lamps 30, 32, 34 and 36 are green and the lamps 31, 33, 35 and 37 are red. Obviously this color arrangement may be varied or the lamps may all be of the same color and other means or markings used to distinguish between them.

Where green and red lamps are used, as above described, the lighting of a green lamp could indicate the presence of another moving body to the rear of the one receiving the signal and the lighting of a red lamp could indicate the presence of another moving body in front of the one receiving the signal.

In some instances a plurality of adjacent lights may be lighted simultaneously by signals coming from various angles as respects the planes of the energized loops thereof. Thus in some instances more than one red light or more than one green light may be lighted and the position of the transmitting device that is actuating the lights may be determined partly by the brightness or intensity of the lights thus differently energized.

The green lamps 30, 32, 34 and 36 are respectively connected by conductors 38 with the radio amplifiers 3, 4, 5 and 6, which amplifiers 3, 4, 5 and 6 are connected respectively with the radio-receiving loops 18, 19, 20 and 21 by the conductors 26. This connects the green lamps with the loops 18, 19, 20 and 21 that are on the side of the body 15 toward the rear of the aircraft or moving body. Thus the lighting of a green lamp indicates the presence of another craft generally to the rear of the receiving craft.

The red lamps 31, 33, 35 and 37 are respectively connected by conductors 39 with the amplifiers 7, 8, 1 and 2 and said amplifiers 7, 8, 1 and 2 are respectively connected with the loops 22, 23, 16 and 17. This connects the red lamps with the loops 22, 23, 16 and 17 that are positioned on the side of the body 15 toward the front of the craft. Thus the lighting of a red lamp indicates the presence of another craft generally in front of the receiving craft.

The position, on the member 28, of the lamp or lamps that are lighted indicates whether the other craft is substantially in line with the receiving craft or is above or below or to one side or the other of the receiving craft.

The body 15, being a radio shield, will prevent any and all loops that are shielded or blocked off by said body 15 as respects the direction from which a signal is being received from being energized enough to light the lamps they are connected with.

The loops that are positioned in planes at an angle to the direction of the incoming signal will be proportionately less affected by the incoming signal and when their angle of inclination is greater than a predetermined angle relative to the direction of the incoming signal they will not be sufficiently affected to actuate the lights.

The circuit from each lamp 30 to 37 back to the amplifier by which it is controlled is completed through the frame of the member 28, along conductor 40 through an interrupter 41, shown diagrammatically in Fig. 1, and more in detail in Fig. 2 and along conductors 42 to the several amplifiers 1 to 8.

The interrupters 14 and 41, illustrated diagrammatically in Figs. 1 and 3, are preferably embodied in one unit, as shown in Fig. 2, and are in the form of discs rigidly mounted on a common shaft 43 and constantly driven by any suitable means, not shown. The periphery of each interrupter disc 14 and 41 is made up of a plurality of alternate sections of electrically conductive material 44 and insulating material 45. The sections 45 of insulation of each disc member 14 and 41 are positioned in transverse registration with the electrically conductive sections 44 of the other disc member and each insulation section 45 is of substantially equal width to the electrically conductive section 44 with which it registers. The width of the sections 44 and 45 circumferentially considered is variable, some being wide and some being narrow.

Obviously the arrangement and relative positioning of the sections 44 and 45 of the two interrupter discs 14 and 41 can be varied so long as the said sections 44 and 45 are paired so that when the discs 14 and 41 are rotated the circuits controlled thereby will be alternately and rapidly opened and closed, one of said circuits always being open when the other is closed.

The disc member 14 is the interrupter in the transmitter circuit and the disc member 41 is the interrupter in the circuits of the receiver and visual signal mechanism. Two relatively insulated brushes 46 and 47 are positioned in brushing contact with the peripheral portions of the respective disc members 14 and 41 and are connected with suitable conductors in the transmitting and receiving circuits respectively so that they will control the flow of current in these circuits.

Obviously the interrupter arrangement just described will provide an interrupted current in both the transmitting circuit and the receiving and signaling circuit so that the transmitter and receiver will be operated alternately and each will be in operation one half of the time but the transmitter and receiver circuits will never both be in operation at the same time. This makes it impossible for a receiver at one station to be operated by the transmitter at the same station.

Preferably a switch 78 is provided in the circuit of the interrupter 41.

In addition to the visual signalling means hereinbefore described and preferably electrically connected in parallel with said hereinbefore described visual signalling means I preferably provide another signalling means that may be used in conjunction with said visual signalling means and that is capable of operating independently in case said visual signalling means fails to operate or is out of order, or is turned off. This second signalling means may be either visible or audible, and one that will operate satisfactorily comprises an audible signal device, such as a horn 49, and an interrupter 50 connected in series with the amplifiers 1 to 8 inclusive by conductors 54 in such a manner that when any one of the amplifiers 1 to 8 is actuated by the energizing of one of the radio receiving loops the horn 49 will be sounded. This will call the attention of the pilot to the fact that there is another moving craft in the vicinity and cause him to observe the visual signal to ascertain the location of the other craft.

Preferably a switch 51 is provided in the circuit of the horn 49 so that this auxiliary signal may be used or shut off at will.

The interrupter 50 is preferably another disc like the disc 41 secured to the shaft 43 and synchronized with the transmitting disc 14 in the same manner as the disc 41, to supply current to the horn 49 only in the increments of time when the transmitter circuit is inoperative.

In Fig. 4 I show a body 52 of radio shielding material which corresponds to the body 15 except that it is shaped to provide cups 53 wherein directional radio-receiving loops 16 to 23 are positioned. The cups 53 may vary in depth depending on the extent of shielding desired. This cupped structure makes it possible to more effectively shut off the incoming signals from radio-receiving loop members that are not positioned substantially parallel in line with the direction of the received signal and renders the device more accurate and more selective.

Obviously part of the body 15 with part of the loops thereon and a corresponding number of amplifiers and signal lamps may be used. For instance, if no information relative to aircraft to the rear of the receiving craft is desired then only the front portion of the body 15 with the loops thereon would need to be used with one amplifier and one lamp for each loop.

Also a group of the directional radio receiving loops may be supported in substantially semispherical relation or at various different angles on a frame or body that does not form a radio shield. In this event each loop will be actuated by a signal coming from either of two directions substantially parallel in line with the direction of the received signal. When this is done the number of signal lights can be correspondingly reduced and lights of different colors are not required.

In the use of this invention on air water and/or land craft each craft of a group will be equipped with one of these devices including both the transmitting and the receiving and signaling apparatus. In each installation the body 15 and light support 28 are both rigidly mounted in the craft in the proper positions relative to each other and suitable means are provided for supplying electric current to the apparatus and for driving the interrupters 14, 41 and 50 at all times when the craft is in motion. This broadcasts from each craft, while in motion, an interrupted radio wave of a known frequency preferably distinctive from the frequencies of radio broadcasts, radio beams, and like disturbances to which the craft will ordinarily be subjected.

At the same time the receiving apparatus of each craft is continuously operating and ready to receive an incoming signal so that when two or more craft equipped with these devices approach each other the receiving apparatus of each craft will pick up the broadcasts from the other craft and warn each pilot of the proximity and locations of the other craft. This warning will be conveyed to each pilot both as an audible and a visual signal and the visual signal will appraise the pilot of the location of the other craft relative to his own. The brightness of the signal light or lights will indicate the distance of the other craft and the order in which successive lights are lighted and extinguished and changes in brightness of the lights will indicate the direction of travel of the other craft and whether it is approaching or receding from the receiving craft.

For instance, if a signal that is broadcast from the transmitter in Fig. 3, is picked up by the loop 19 of Fig. 1, it will actuate or control the radio amplifier 4 in such a manner as to cause said amplifier 4 to pass enough current to the green lamp 32 to light said lamp thus indicating to the pilot of the receiving craft that there is another craft behind him and to his right.

It will be noted that the alternate sections of electrically conductive material 44 and insulating material 45 on the interrupter discs 14 and 41 are of different width considered circumferentially of these discs.

Also these discs may be rotated at different speeds in the different signal units. This makes it impossible for the insulating sections 45 of a disc 41 in the receiving circuit of one signal unit to operate in exact step or synchronism with the insulating sections 45 of a disc 14 in the transmitting circuit of another signal unit and thus completely blank out and fail to pick up a signal.

From the foregoing description it will be seen that this proximity and direction indicator can be used on moving bodies in air, in or on water, and on land to transmit signals between those bodies for many different purposes, such as for the prevention of collisions, for indicating whether another moving body or craft is the craft of a friend or foe and for showing to each pilot and/or driver on a moving body the relative position of the other moving bodies of a group to thereby help him maintain a desired formation under any condition of visibility.

Obviously the signals transmitted by my device may be broadcast in code and may be de-coded in the receiver before they actuate the signal devices. Coding apparatus suitable for this type of code broadcasting and receiving is disclosed in my co-pending apparatus Serial No. 420,731, filed November 27, 1941, now abandoned.

The use of such code broadcasting and reception will make it impossible for a foe to use a confusingly similar broadcast and thus render the signalling system useless or turn it to his own advantage, such as to represent himself as a friend instead of foe.

Obviously changes in this invention may be made within the scope and spirit of the following claims.

Having described my invention, what I claim as new and desire to protect by Letters Patent is:

1. In a proximity and direction indicator, rotatable electric circuit interrupter means, comprising two relatively fixed circular rows of alternate conductor and insulator members, each conductor of each row being paired with an insulator of equal width of the other row, two contactors positioned for simultaneous engagement with the conductor and insulator member of each pair and for successive engagement with said pairs of conductor and insulator members as the circuit interrupter is rotated, a transmitter circuit connected with one of said contactors, a receiving circuit connected with the other of said contactors and signal devices and a direction distinguishing means connected with said receiving circuit.

2. In a proximity and direction indicator, rotatable electric circuit interrupter means, comprising two relatively fixed circular rows of alternate conductor and insulator members of variable widths, each conductor of each row being paired with an insulator of equal width of the other row, two contactors positioned for simultaneous engagement with the conductor and insulator member of each pair and for successive engagement with said pairs of conductor and insulator members as said circuit interrupter is rotated, a transmitting circuit connected with one of said contactors, a receiving circuit connected with the other of said contactors and signal devices and direction distinguishing means connected with said receiver means.

3. A proximity and direction indicator comprising rotatable electric circuit interrupter means having two relatively fixed circular rows of alternate conductor and insulator members of variable widths, each conductor of each row being paired with an insulator of equal width of the other row, two contactors positioned for simultaneous engagement with each conductor and insulator member of each pair as the circuit interrupter is rotated, a transmitter circuit controlled by one row of conductor and insulator members, a receiver circuit controlled by the other row of conductor and insulator members, and signal devices and direction distinguishing means connected with said receiving circuit.

FRANK ELLISON BEST.

REFERENCES CITED

The following references are of record in the file of this patent:

UNITED STATES PATENTS

| Number | Name | Date |
|---|---|---|
| 650,255 | Kitsee | May 22, 1900 |
| 954,641 | Marconi | April 12, 1910 |
| 1,433,599 | Bown | Oct. 31, 1922 |
| 1,491,743 | Bradfield | Apr. 22, 1924 |
| 1,585,591 | Lowy | May 18, 1926 |
| 1,601,322 | Press | Sept. 28, 1926 |
| 1,607,831 | Krohn | Nov. 23, 1926 |
| 1,907,471 | Alexanderson | May 9, 1933 |
| 1,923,430 | Fanning | Aug. 22, 1933 |
| 2,104,075 | Franklin | Jan. 4, 1938 |
| 2,146,724 | Dunnmore | Feb. 14, 1939 |
| 2,157,122 | Dunnmore | May 9, 1939 |
| 2,189,549 | Hershberger | Feb. 6, 1940 |
| 2,231,929 | Lyman | Feb. 18, 1941 |

FOREIGN PATENTS

| Number | Country | Date |
|---|---|---|
| 385,084 | France | Feb. 27, 1908 |
| 10,586/09 | Great Britain | Apr. 7, 1910 |

OTHER REFERENCES

"Radio Engineering," by F. E. Terman, second edition 1937, pp. 722, 723, and 724, published by McGraw-Hill Book Co., New York, N. Y. (Copy in Div. 51.)